United States Patent
Liu et al.

(10) Patent No.: US 7,637,617 B2
(45) Date of Patent: Dec. 29, 2009

(54) METHOD AND DEVICE FOR GENERATING RETINAL IMAGES USING THE STIGMATISM OF THE TWO FOCI OF A SUBSTANTIALLY ELLIPTICAL SIGHT

(75) Inventors: Zile Liu, Epinay sur Orge (FR); Rachid Hamdani, Maisons Alfort (FR)

(73) Assignee: Laster, Gif sur Yvette (FR)

( * ) Notice: Subject to any disclaimer, the term of this patent is extended or adjusted under 35 U.S.C. 154(b) by 80 days.

(21) Appl. No.: 10/588,812

(22) PCT Filed: Feb. 9, 2005

(86) PCT No.: PCT/FR2005/000287

§ 371 (c)(1),
(2), (4) Date: Jul. 24, 2007

(87) PCT Pub. No.: WO2005/078510

PCT Pub. Date: Aug. 25, 2005

(65) Prior Publication Data

US 2007/0285793 A1    Dec. 13, 2007

(30) Foreign Application Priority Data

Feb. 10, 2004    (FR) .................................... 04 01311

(51) Int. Cl.
*A61B 3/10* (2006.01)
*G02B 27/14* (2006.01)

(52) U.S. Cl. ........................ 351/221; 359/630; 359/631; 345/7

(58) Field of Classification Search ................ 351/205, 351/206, 211, 214, 221; 359/630, 631; 345/7, 345/8
See application file for complete search history.

(56) References Cited

U.S. PATENT DOCUMENTS

| 3,982,827 | A | * | 9/1976 | Gambs ....................... 351/214 |
| 5,384,654 | A | | 1/1995 | Iba et al. |
| 5,867,134 | A | | 2/1999 | Alvelda et al. |
| 6,252,565 | B1 | | 6/2001 | Hall |
| 2001/0010598 | A1 | | 8/2001 | Aritake et al. |

FOREIGN PATENT DOCUMENTS

JP    02136816    5/1990

* cited by examiner

*Primary Examiner*—Huy K Mai
(74) *Attorney, Agent, or Firm*—Browdy and Neimark, PLLC

(57) ABSTRACT

A method for generating retinal images using the stigmatism of the two foci (F, F') of a substantially elliptical sight (E) with a semi-reflective surface, wherein a so-called object focus consisting of the diaphragm of a pinhole disc forming the convergence point of an image generated by a light-emitting display or a collimated light source is positioned adjacent to the first focus (F) of the substantially elliptical sight (E), a so-called image focus consisting of the pupil or the centre of the user's eye (OE) is positioned adjacent to the second focus (F') of said substantially elliptical sight (E), and the image generated by said light-emitting display or said collimated light source and reflected by the semi-reflective surface of the substantially elliptical sight (E) is projected adjacent to the retina of the user's eye.

17 Claims, 12 Drawing Sheets

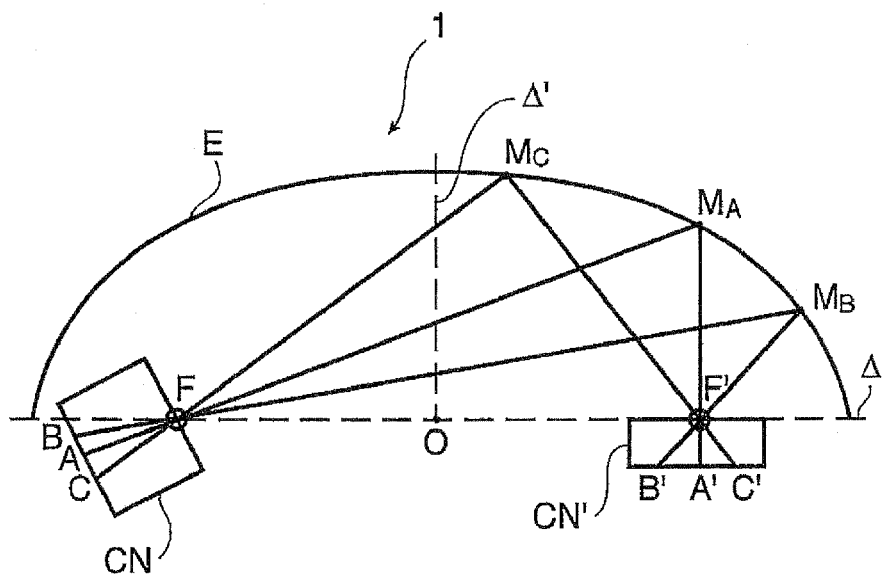
Figure 1
Amended

METHOD AND DEVICE FOR GENERATING RETINAL IMAGES USING THE STIGMATISM OF THE TWO FOCI OF A SUBSTANTIALLY ELLIPTICAL SIGHT

BACKGROUND OF THE INVENTION

1. Field of the Invention

The present invention relates to a method for generating retinal images using the stigmatism of two foci of a substantially elliptical diopter.

More particularly, its object is to solve problems of viewing virtual realities or augmented realities, by the retina of the eye.

Generally, it is known that many studies have been carried out in the field of displaying of information superimposed on the vision of the environment captured by the retina of the eye.

2. Description of Prior Art

These methods intended for military applications during first developments in the 1960s, consist of projecting on a semi-reflecting transparent surface, symbols and information relating to the piloting of the aircraft, i.e., in this case, a horizon line, speed, altitude and guiding information for approaching the landing runway. These devices, so-called high head collimators, facilitate the piloting of the aircraft by allowing direct perception of the speed vector, of the incidence and of the potential slope, as well as a graduated horizon and a synthetic runway with positioning information on the automatic landing system. With this symbology, approaches with or without visibility may be piloted intuitively and accurately; however, it should be sufficiently relevant while not occulting the actual field of view.

Introduction of these high head collimators is effective to date in civil cockpits with which the approach may be essentially facilitated and thereby avoiding erroneous perceptions, upon visual approach, of the height and trajectory under particular atmospheric conditions.

More recently, automobile manufacturers have developed high head display devices directly on the windscreen of the vehicle; indeed, the time required for moving the eye (diversion time) for viewing the information, added to the accommodation time and reading time of the eye (fixation time), added to the return time (diversion time) is of 1 second in the conventional environment with an instrument panel: It is of 0.5 second in high head vision; this reduction in the overall perception time for a piece of information corresponds to a 8 meter travel of the vehicle at 60 kilometers per hour.

These devices require that the image be projected on a transparent surface via an optical apparatus, placed below or above the instrument panel or the dashboard, comprising several lenses and mirrors. Thus, these devices similar to overhead projectors are bulky and require fittings in the driver's cell.

Another solution consists of projecting the image on the visor of a helmet; this solution adopted by fighter pilots notably allows a synthetic rear view to be displayed; it is also adopted by surgeons as an aid for conducting surgical operations, as well as by motorcyclists.

The most ergonomic solution consists of directly projecting the image on the retina; this solution however requires that the movement of the eye be taken into account, a short latency time, a horizontal and vertical field of view close to that of the eye and self-collimation at infinity of the image allowing natural accommodation of the eye.

The present devices consist of placing an optical module, mounted on a helmet, close to the eye; the optical module either uses a laser type source or LCD, LCoS or OLED type displays and particularly bulky optical architectures notably when the field-of-view angles provided to the user are large; these bulky dimensions increase all the more with the field of view provided to the user.

OBJECT OF THE INVENTION

Therefore, the object of the invention more particularly is to suppress these drawbacks.

SUMMARY OF THE INVENTION

By applying a substantially elliptical diopter comprising a semi-reflecting surface, it proposes for this purpose:
  positioning in the vicinity of the first focus (F) of said substantially elliptical diopter (E):
    a so-called "source" focus formed by the diaphragm of a pin diaphragm forming the convergence point of an image generated by a luminous display or by a light source, or
    a luminous display, each object point of which generates a beam which is first of all convergent before reflection on the semi-reflecting surface of said substantially elliptical diopter, and then parallel in the vicinity of the pupil of the eye,
  positioning in the vicinity of the second focus (F') of said substantially elliptical diopter (E), a so-called "image" focus formed by the pupil or the centre of the eye (OE) of the observer,
  projecting in the vicinity of the retina of the eye of the observer, the image generated by said luminous display or by said light source and reflected by the semi-reflecting surface of said substantially elliptical diopter (E).

More specifically, as regards the use of a luminous display, an optical system generates for each source point, a beam which is first of all convergent before reflection on the semi-reflecting surface. After reflection, the beams of light containing the inverted image emitted by the display then arrive collimated in the vicinity of the second focal point of said substantially elliptical diopter.

By using a substantially elliptical diopter, it is further possible to reduce the diameter of the whole of the light beams forming the image in the vicinity of the so-called "source" focus where the source is placed and therefore the dimensions of the optics in the vicinity of the luminous display, when a large field of vision with collimation of the light beams in the vicinity of the pupil of the eye is sought.

Moreover, as regards the use of a pin diaphragm, among the beams of light emitted by the luminous display, the only ones which may pass through the pin diaphragm located in the vicinity of the first focus, are the beams comprised in cones, the apices of which are located on the luminous display and resting on the periphery of said pin diaphragm; the whole of these beams of light forms an inverted image of the one generated by the luminous display; the dimension of each image point is determined by the dimension of the pin diaphragm on the one hand and by the distances separating the luminous display of the pin diaphragm and the distance separating the plane containing the image and the pin diaphragm on the other hand.

Thus, the beams of light containing the inverted image emitted by the display are then reflected by the semi-reflecting surface of the substantially elliptical diopter and then focused in the vicinity of the second focus of said substantially elliptical diopter, taking into account the existence of absolute stigmatism between two particular points forming the foci of the ellipse.

Moreover, the pupil of the eye being located in the vicinity of the second focus, considered as being able to be assimilated to a diaphragm or pin diaphragm, is in turn crossed by an image from the aforesaid reflected beams of light, which image ends up on the retina of the eye.

It is to be noted that the eye on the one hand and the luminous display associated with its pin diaphragm on the other hand, form two dark rooms, the "pupils" of which are conjugate on both foci of the ellipse forming the semi-reflecting surface of the substantially elliptical diopter.

BRIEF DESCRIPTION OF THE DRAWINGS

Several embodiments of the invention will be described hereafter, as a non-limiting example, with reference to the appended drawings wherein:

FIG. 1 is schematic illustration of the theoretical principle of the device according to the invention.

DESCRIPTION OF THE PREFERRED EMBODIMENTS

In the example illustrated in FIG. 1, the device 1 according to the invention consists of:

a substantially elliptical diopter illustrated by the half-ellipse E defined by its major axis $\Delta$, its minor axis $\Delta'$, its centre O and its two foci F, F' located on the major axis $\Delta$, on either side of the centre O, two dark rooms CN, CN', the pupils of which are respectively located in the vicinity of the foci F, F'.

Thus, the beams from the dark room CN, pass through the pupil of said dark room CN, and are then reflected on the concave wall of the optical diopter to reach the dark room CN' after having passed through the pupil of said dark room CN'; three rays symbolize the trajectory of the aforesaid beams, i.e.:

ray $AM_AA'$ from the source point A of the dark room CN, reflected in the vicinity of the point $M_A$ on the ellipse and then ending up at the image point A' of the dark room CN', ray $BM_BB'$ from the source point B of the dark room CN, reflected in the vicinity of the point $M_B$ on the ellipse and then ending up at the image point B' of the dark room CN', ray $CM_CC'$ from the source point C of the dark room CN, reflected in the vicinity of the point $M_C$ on the ellipse and then ending up at the image point C' of the dark room CN'.

Figure 2:
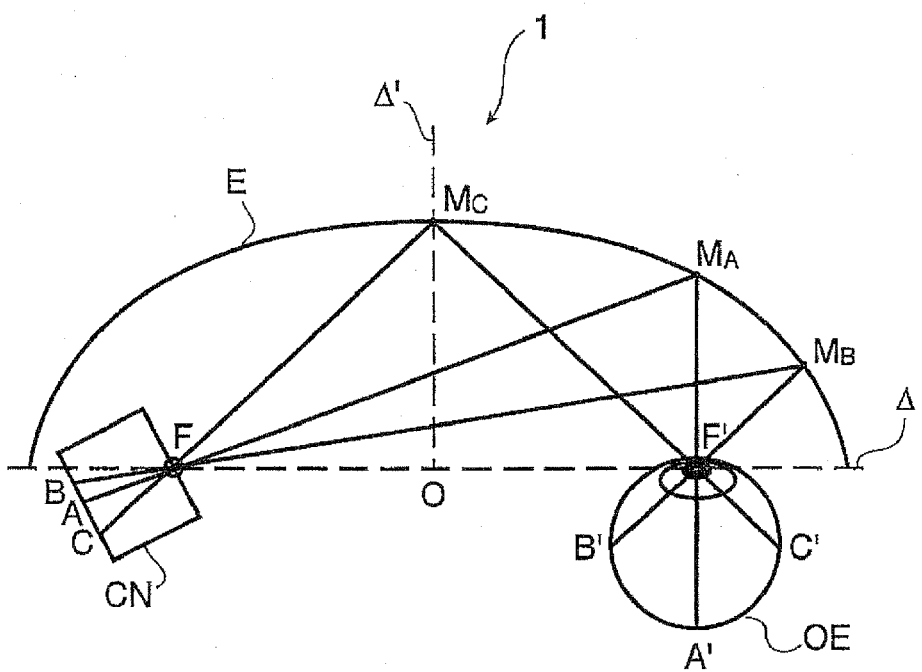
FIG. 2 is a schematic illustration of a first version of the device.

In the example illustrated in FIG. 2, the device 1 according to the invention consists of:

a substantially elliptical diopter illustrated by the half-ellipse E defined by its major axis $\Delta$, its minor axis $\Delta'$, its centre O and its two foci F, F', located on the major axis $\Delta$, on either side of the centre O, a dark room CN, the pupil of which is located in the vicinity of the focus F, an eye OE, schematically illustrated by a circle and the pupil of which is located in the vicinity of the focus F'.

This configuration forms a first version of the device according to the invention.

Indeed, the beams from the dark room CN, pass through the pupil of said dark room CN, and are then reflected on the concave wall of the optical diopter to reach the retina of the eye OE after having passed through the pupil of said eye OE; three rays symbolize the trajectory of the aforesaid beams, i.e.:

ray $AM_AA'$ from the source point A of the dark room CN, reflected in the vicinity of the point $M_A$ on the ellipse and then ending up at the image point A' of the retina of the eye OE, ray $BM_BB'$ from the source point B of the dark room CN, reflected in the vicinity of the point $M_B$ on the ellipse and then ending up at the image point B' of the retina of the eye OE, ray $CM_CC'$ from the source point C of the dark room CN, reflected in the vicinity of the point $M_C$ on the ellipse and then ending up at the image point C' of the retina of the eye OE.

It may be noticed that this first configuration allows a large field of view; it nevertheless requires that the eye be fixed relatively to the substantially elliptical diopter.

Figure 3:
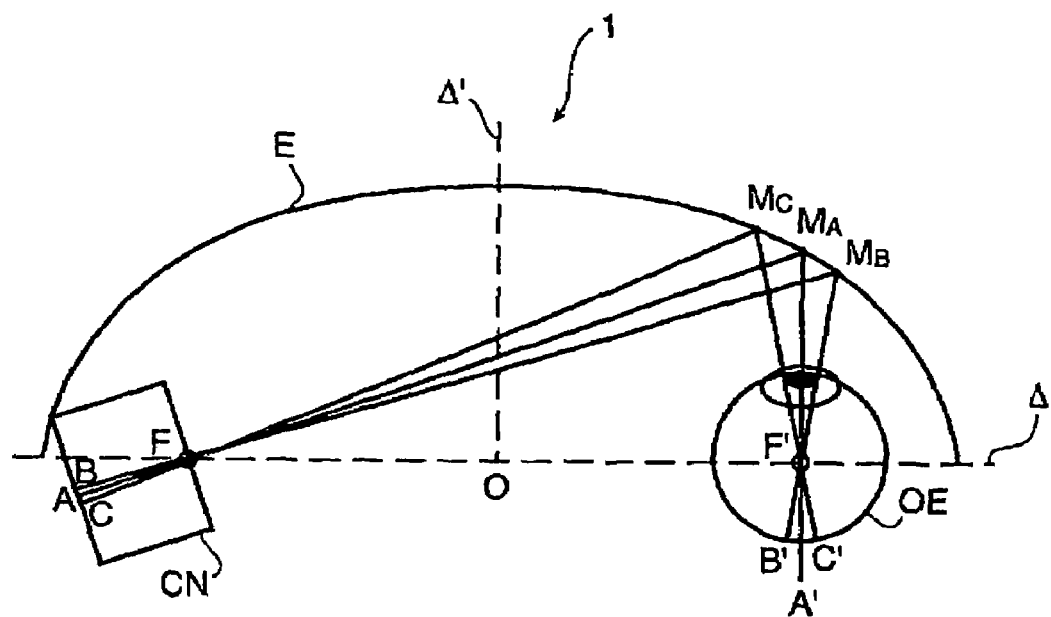
FIG. 3 is a schematic illustration of a second version of the device

In the example illustrated in FIG. 3, the device 1 according to the invention consists of:

a substantially elliptical diopter illustrated by the half-ellipse E defined by its major axis $\Delta$, its minor axis $\Delta'$, its centre O and its two foci F, F', located on the major axis $\Delta$, on either side of the centre O, a dark room CN, the pupil of which is located in the vicinity of the focus F, an eye OE, schematically illustrated by a circle and the pupil of which is located in the vicinity of the focus F'.

This configuration forms a second version of the device according to the invention.

Indeed, the beams from the dark room CN, pass through the pupil of said dark room CN, and are then reflected on the concave wall of the optical diopter to reach the retina of the eye OE after having passed through the pupil of said eye OE; three rays symbolize the trajectory of the aforesaid beams, i.e.:

ray $AM_AA'$ from the source point A of the dark room CN, reflected in the vicinity of the point $M_A$ on the ellipse and then ending up at the image point A' of the retina of the eye OE, ray $BM_BB'$ from the source point B of the dark room CN, reflected in the vicinity of the point $M_B$ on the ellipse and then ending up at the image point B' of the retina of the eye OE, ray $CM_CC'$ from the source point C of the dark room CN, reflected in the vicinity of the point $M_C$ on the ellipse and then ending up at the image point C' of the retina of the eye OE.

It may be noticed that this second configuration does not allow a large field of view, as the perceived field is limited by the diameter of the pupil of the eye; however it allows the field to be scanned by pivoting the eye.

Figure 4:
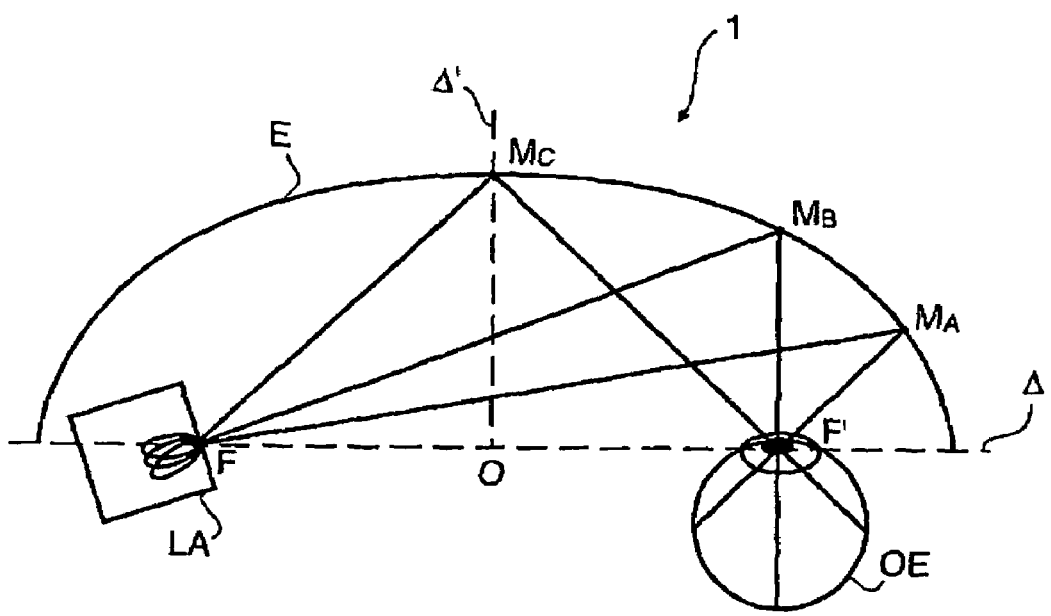
FIG. 4 is a schematic illustration of a third version of the device

In the example illustrated in FIG. 4, the device 1 according to the invention consists of:

a substantially elliptical diopter illustrated by the half-ellipse E defined by its major axis $\Delta$, its minor axis $\Delta'$, its centre O and its two foci F, F', located on the major axis $\Delta$, on either side of the centre O, a laser LA emitting a collimated light beam, with variable orientation, the deflection centre of which is located in the vicinity of the focus F, an eye OE, schematically illustrated by a circle and the pupil of which is located in the vicinity of the focus F'.

This configuration forms a third version of the device according to the invention.

Indeed, the beams from the laser LA, are deflected in the vicinity of the focus F, and then reflected on the concave wall of the optical diopter to reach the retina of the eye OE after having passed thought the pupil of said eye OE; three rays symbolize the trajectory of the aforesaid beams, i.e.:

ray $FM_AA'$ from laser LA, reflected in the vicinity of the point $M_A$ on the ellipse and then ending up at the image point A' of the retina of the eye OE, ray $FM_BB'$ from laser LA, reflected in the vicinity of the point $M_B$ on the ellipse and then ending up at the image point B' of the retina of the eye OE, ray $FM_CC'$ from laser LA, reflected in the vicinity of the point $M_C$ on the ellipse and then ending up at the image point C' of the retina of the eye OE.

It may be noticed that the image conveyed by the scanning of the collimated light beam from the laser A, is "written" on the retina of the eye OE.

In a more specific way, the aforesaid collimated light beam has a certain diameter; consequently, the marginal rays, parallel to the main ray, will converge after reflection on the substantially elliptical diopter in the vicinity of the pupil; thus, the beam received by the eye will be slightly divergent in the vicinity of the retina, causing vision by said eye to be non-compliant with the perception of an object placed at infinity.

Thus, a divergence of the beam captured by the retina of 1 mrad creates the illusion of a source point of 4 mm located at 4 meters.

As for the field of view of the device according to this third version, the latter depends on the scanning aperture of the collimated light beam.

Generally, the propagation structure of the rays as described earlier, from focus F, reflected on the ellipse E and ending up at the focus F', may be illustrated in linear form.

Figure 5:
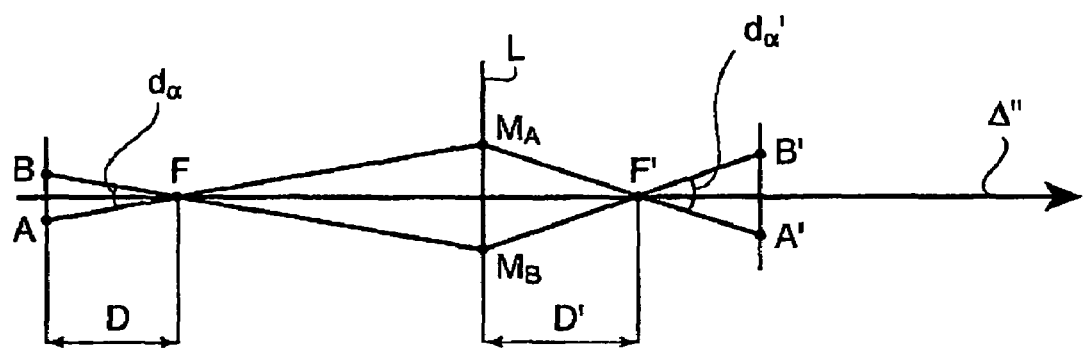
FIG. 5 is a modeling of the path of the light beams in the device.

In the example illustrated in FIG. 5, propagation of the rays is symbolized by a propagation axis $\Delta''$ containing the foci F, F'; the ellipse section E reflecting the rays is symbolized by a line segment L perpendicular to the propagation axis $\Delta''$ and located between the foci, F, F'.

In the case of a given pixel of a display placed in the vicinity of the focus F (source focus), two rays from the end A, B, of a given pixel, are located at a given distance D upstream from the focus F. These rays from the end A, B of a pixel pass through the focus F, and are then reflected by the ellipse E, symbolized by the line segment L, in the vicinity of the points $M_A$, $M_B$, respectively, and then pass through the focus F', located at a distance D' from the line segment L, to end up at two "image" points A', B'.

Thus, the angle $d\alpha'$ at the apex F', contained between both lines $M_AA'$ and $M_BB'$ depends on the distance between both points $M_A$, $M_B$ and on the distance D' which separates the line segment L and the focus F'; moreover, the distance between the points $M_A$, $M_B$ depends on the distance which separates both points A, B and the distance D which separates the points A, B and the focus F:

let $d\alpha$ be the angle at the apex F, contained between both lines $M_AA$ and $M_BB$, let dy be the distance between both source points A, B, let D be the distance which separates the source points A, B from the focus F, let D' be the distance which separates the line segment L from the focus F', let $d\alpha'$ be the angle at the apex F', contained between both lines $M_AA'$ and $M_BB'$, while considering both source points A, B as being the width of an elementary pixel of a luminous matrix display, the aperture angle $d\alpha$ of a pixel is given by the relationship:

$$\tan d\alpha \approx d\alpha = dy/D$$

the angle $d\alpha'$ under which the pixel is seen by the eye is given by the relationship:

$$\tan d\alpha' \approx d\alpha' = dy'/D'$$

As a numerical example, a pixel of diameter 25 μm, placed at a distance D of 50 mm from the focus F corresponds to an aperture angle close to 0.5 milliradians; this value should be compared with visual acuity, close to 0.3 milliradians, which allows an object of diameter 1 millimeter to be distinguished at a distance of 4 meters.

It will be supposed that the ellipse E is characterized by:

a half major axis of length a collinear with axis $\Delta$, a half minor axis of length b, collinear with axis $\Delta'$, the abscissae of foci F, F' on axis $\Delta$ are c and −c, respectively.

Moreover:

let i be any source point, the corresponding ray passing through the focus F will be reflected on the substantially elliptical diopter at point $M_i$, and will then pass through the focus F' giving an intermediate image point i', let $\alpha$ be the angle, the so-called "pointing angle", formed by the line passing through points i and F with the major axis $\Delta$ of the ellipse E, let $FM_i$ be the length of the first half-chord, let $M_iF'$ be the length of the second half-chord.

The lengths of the half-chords $FM_i$ and $M_iF'$ are defined by the following relationships:

$$FM_i = \frac{b^2|c|\sqrt{(1+\tan^2\alpha)} \pm ab^2(1+\tan^2\alpha)}{(b^2+a^2\tan^2\alpha)} \quad (-\pi/2\langle\alpha\langle\pi/2)$$

$$M_iF' = 2a - \frac{b^2|c|\sqrt{(1+\tan^2\alpha)} \pm ab^2(1+\tan^2\alpha)}{(b^2+a^2\tan^2\alpha)} \quad (-\pi/2\langle\alpha\langle\pi/2)$$

The pointing angle $\alpha$ may vary from 0 to $\pi/2$; the lengths of the half-chords $FM_i$, $M_iF'$ vary accordingly, their sum $FM_i + M_iF'$ remaining constant, equal to $2a$.

As an example, it will be assumed:
a=30.46 mm,
b=28 mm,
c=12 mm,
the eccentricity of the ellipse, i.e., e=c/a=0.39,
$\alpha$ varying from 0 to $\pi/2$, the length of the half-chord $FM_i$i varies from 42.46 mm to 25.74 mm, and the length of the half-chord $M_iF$ varies from 18.46 mm to 35.18 mm.

Figure 6:
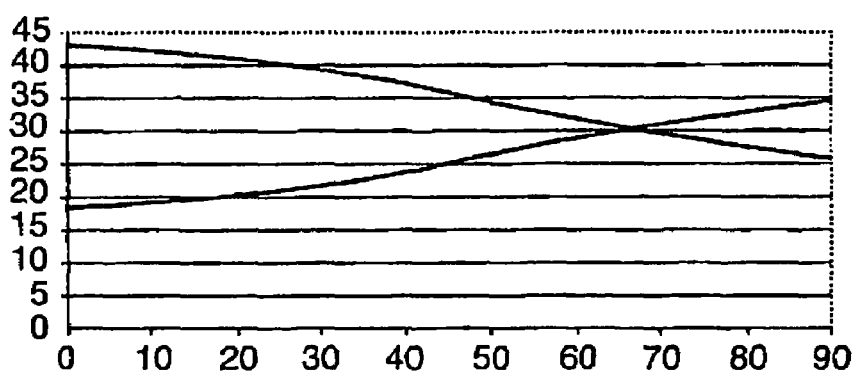
FIG. 6 is a numerical example of the variation of the "half-chords" versus the aperture angle of the light source.

FIG. 6 illustrates the variations of said half-chords $FM_i$, $M_iF$.

Figure 7:
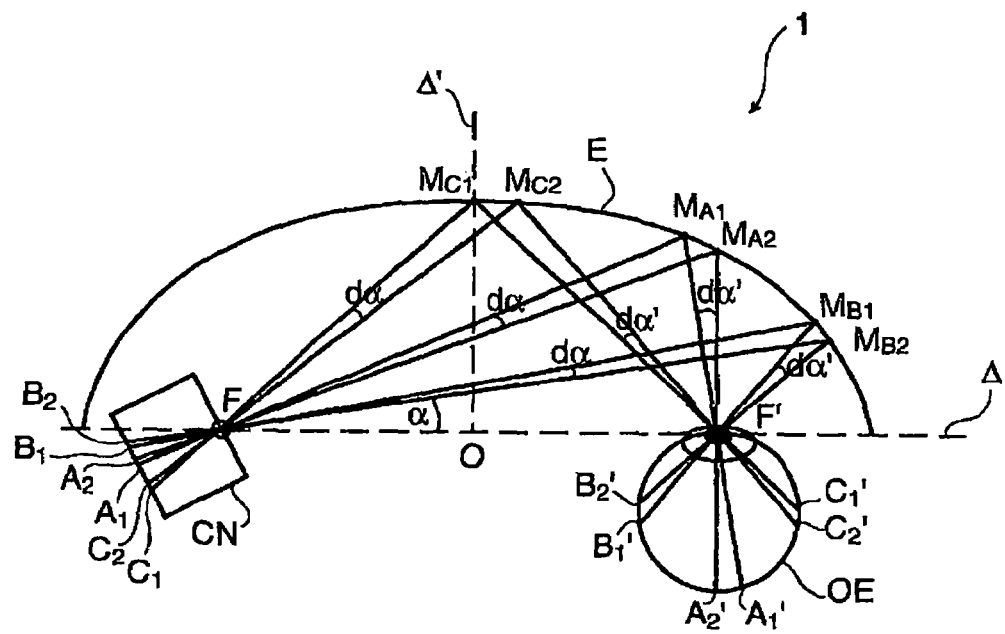
FIG. 7 is a schematic illustration of the path of the light beams, with which the optical resolution of the device may be viewed.

In the example illustrated in FIG. 7, the device according to the invention consists of:
  a substantially elliptical diopter illustrated by the half-ellipse E defined by its major axis $\Delta'$, its minor axis $\Delta'$, its centre O and its two foci F, F' located on the major axis $\Delta$, on either side of the centre O,
  a dark room CN, the pupil of which is located in the vicinity of focus F,
  an eye OE, schematically illustrated by a circle and the pupil of which is located in the vicinity of the focus F'.

The beams from the dark room CN, pass through the pupil of said dark room CN, and are then reflected on the concave wall of the optical diopter, to reach the retina of the eye OE after having passed through the pupil of said eye OE; six rays symbolize the trajectory of the aforesaid beams, i.e.:
  ray $A_1M_{A1}A_1$ from the source point $A_1$ of the dark room CN, reflected in the vicinity of point $M_{A1}$ on the ellipse and ending up at image point $A_1'$ of the retina of the eye OE,
  ray $A_2M_{A2}A_2$ from the source point $A_2$ of the dark room CN, reflected in the vicinity of point $M_{A2}$ on the ellipse and ending up at image point $A_2'$ of the retina of the eye OE,
  ray $B_1M_{B1}B_1$, from the source point B, of the dark room CN, reflected in the vicinity of point $M_{B1}$ on the ellipse and ending up at image point $B_1'$ of the retina of the eye OE,
  ray $B_2M_{B2}B_2'$ from the source point $B_2$ of the dark room CN, reflected in the vicinity of point $M_{B2}$ on the ellipse and ending up at image point $B_2'$ of the retina of the eye OE,
  ray $C_1M_CC_1$, from the source point $C_1$ of the dark room CN, reflected in the vicinity of point $M_{C1}$ on the ellipse and ending up at image point $C_1'$ of the retina of the eye OE,
  ray $C_2M_{C2}C_2'$ from the source point $C_2$ of the dark room CN, reflected in the vicinity of point $M_{C2}$ on the ellipse and ending up at image point $C_2'$ of the retina of the eye OE.

Let:
$A_1A_2$ be the width of pixel A,
$B_1B_2$ be the width of pixel B,
$C_1C_2$ be the width of pixel C,
$d\alpha$ the aperture angle of the corresponding pixel,
$\alpha$ the pointing angle corresponding to the rays associated with said pixel.

Thus, the angle $d\alpha'$ seen from the eye through the pupil located in the vicinity of the focus F' will depend on the pointing angle $\alpha$; the angle $d\alpha'$ decreases when $\alpha$ varies from 0 to $\pi/2$.

From the numerical example mentioned earlier, it is noticed that for $\alpha$ between 0° and 20°, each pixel may be seen by the eye as a point of radius 1 mm located at a distance of 1 meter ($d\alpha'$=1 milliradian).

For $\alpha$ larger than 20°, each pixel may be seen by the eye as a point with a radius less than 1 mm, located at a distance of 1 meter ($d\alpha'$<1 milliradian).

Figure 8:
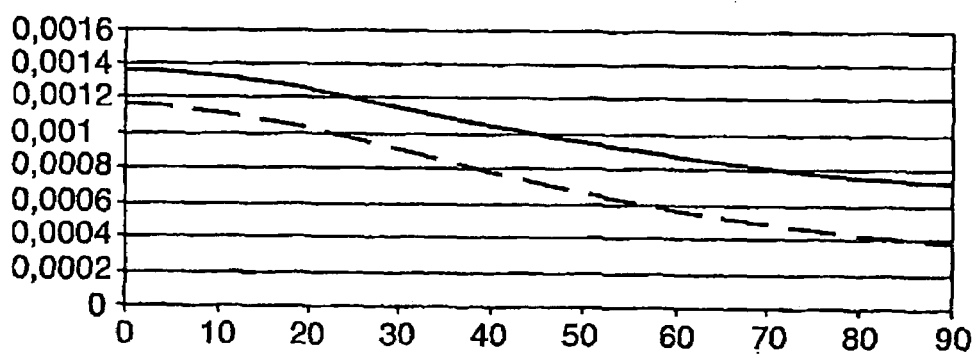
FIG. 8 is a numerical example of the variation of the optical resolution versus the pointing angle of the beam emitted by the light source.

FIG. 8 illustrates the variation of the angle $d\alpha'$, expressed in radians, versus the pointing angle $\alpha$, expressed in degrees, in the case of a collimated light beam of diameter 25 μm (solid line curve), and in the case of a pin diaphragm of diameter 25 μm (dotted line curve).

The field of view allowed by the substantially elliptical diopter is theoretically 180°; nevertheless, this field of view is limited by the pupil of the eye on the one hand and by layout of the components making the device on the other hand.

Moreover, it is known that the horizontal field of vision of the eye is about 120°; as for the vertical field of vision of the eye it is close to 60°.

As described earlier, the field of vision may attain 60° with a resolution less than 1 milliradian, the pointing angle should be larger than 20°.

The aperture angle $d\alpha$ of a pixel is given by the relationship:

$\tan d\alpha \approx d\alpha = dy/D$

The angle $d\alpha'$ under which is pixel is seen by the eye is given by the relationship:

$\tan d\alpha' \approx d\alpha' = dy'/D'$

It is seen that the $d\alpha'/d\alpha$ ratio is not constant as a function of the pointing angle $\alpha$, moreover, this ratio is larger than 1; in other words, the substantially elliptical diopter causes a variable magnification effect depending on the pointing angle.

Figure 9:
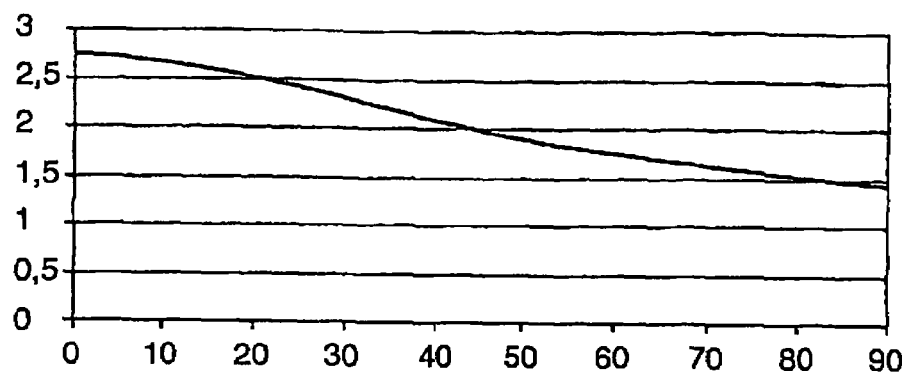
FIG. 9 illustrates the optical distortion generated by the device.

This is illustrated by FIG. 9 showing the variation of the $d\alpha'/d\alpha$ ratio; the pointing angle $\alpha$ varying from 0 to $\pi/2$, the $d\alpha'/d\alpha$ ratio varies from 2.7 to 1.4.

Accordingly, the pixels located along the edge of the luminous display will appear larger than those located at the centre of said luminous display; in this case this is a distortion effect caused by the substantially elliptical diopter.

Different solutions may be contemplated:
  compressing the source image according to a reciprocal mathematical function by means of a computer method,
  tilting the source image so that the pixels located along the edge are seen under a lower angle than those located at the opposite end,
  implanting an optical system generating inverse distortion aberration so as to compensate the distortion caused by the substantially elliptical diopter.

Moreover, it is seen that the light rays passing through the pupil of the eye are not strictly parallel; a slight convergence in the numerical example mentioned earlier, is close to 0.5 milliradians; this has the effect of putting a strain on the eye during extended observation, being aware that natural accommodation of the eye is performed for an object located at infinity.

According to the invention, an optical configuration consisting of generating for each object point a larger beam consisting of rays for which the pointing angle is such that the rays converge in a single point, and are then reflected on the substantially elliptical diopter E before ending up with parallel rays close to the second focus F'.

This configuration provides less strain on the eye on the one hand and improvement of the contrast, given that not a single ray but a wider section of rays corresponds to each object point.

Figure 10:
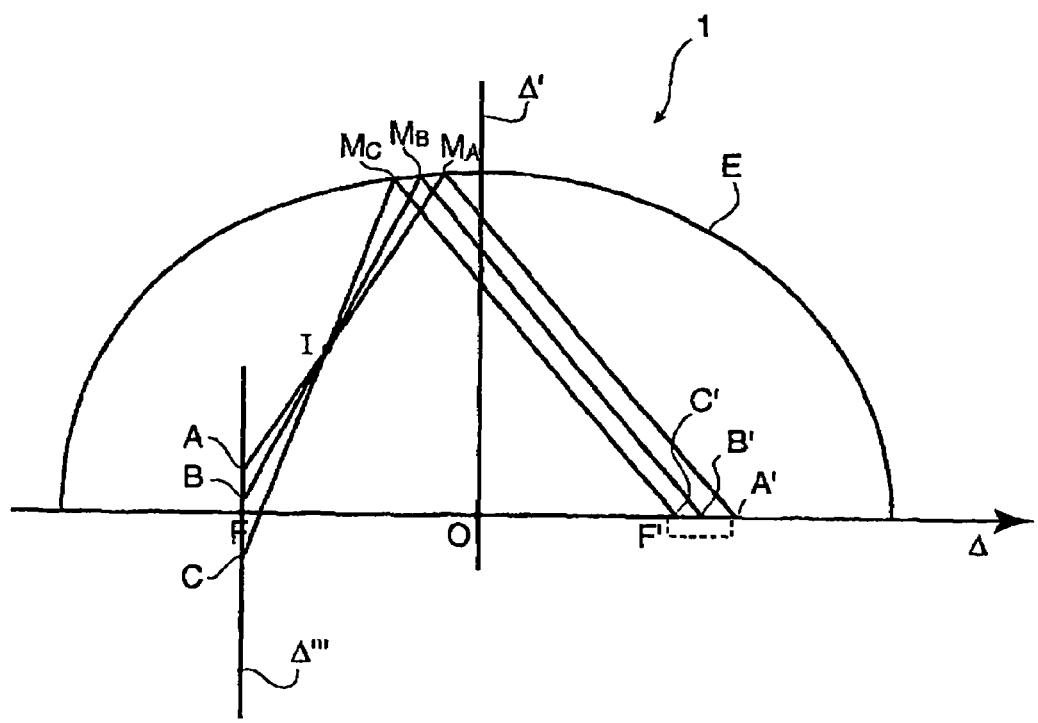
FIG. 10 is a schematic illustration of a configuration allowing parallelization of the beams at the entrance of the eye.

In the example illustrated in FIG. 10, the device according to the invention consists of a substantially elliptical diopter illustrated by the half ellipse E defined by its major axis Δ, its minor axis Δ', its center O, and both of its foci F, F' located on the major axis Δ, on either side of the centre O.

The dark room and the eye are positioned in an identical way with that proposed in the previous configurations, but they are not illustrated.

Three rays symbolize the trajectory of the beam associated with a source point; they are from three points A, B, C, located on an axis Δ''', perpendicular to the Δ axis and passing through the first focus F:

ray $AM_A A'$ from point A, reflected close to the point $M_A$ on the ellipse but ending up at point A' located on the Δ axis, close to the second focus F', ray $BM_B B'$ from point B, reflected close to the point $M_B$ on the ellipse but ending up at point B' located on the Δ axis, close to the second focus F', ray $CM_C C'$ from point C, reflected close to the point $M_C$ on the ellipse but ending up at point C' located on the Δ axis, close to the second focus F'.

It will be noted that the three reflected rays $M_A A'$, $M_B B'$, $M_C C'$ are parallel, which allows displacement of the pupil of the eye without loss of any field of view.

This result is obtained by having the three incident rays $AM_A$, $BM_B$, $CM_C$, converge at a same point I located in the space defined by the line Δ''' and the ellipse E.

Thus, by having each source point of the luminous display converge on convergent points along a certain curve, a somewhat "inverted distortion" of the source points relatively to that intrinsically generated by the substantial elliptical diopter, is achieved.

Figure 11:
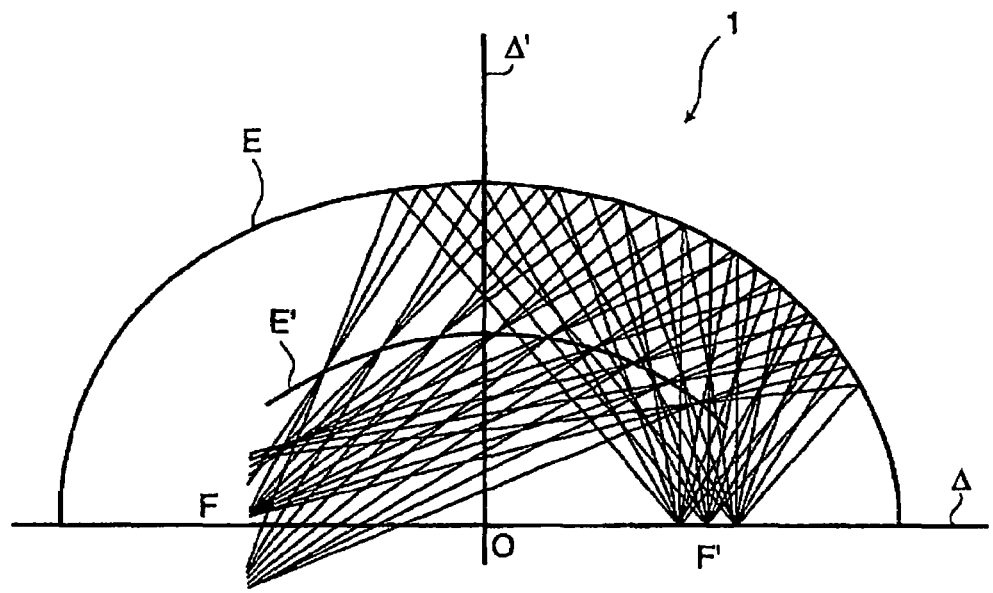
FIG. 11 is a schematic illustration of a first solution allowing optical distortion to be corrected.

In the example illustrated in FIG. 11, each beam from a source point must first converge towards a convergent point which is specific to it before being reflected on the substantially elliptical diopter; this is in fact the required and sufficient condition for obtaining parallel beams entering the pupil of the eye for each of the source points.

The set of the different convergence points follows a curve E'.

Moreover, it may be seen that the aperture angle of the beams in the vicinity of the aforesaid curve E' is constant; consequently, in the case of the third version as described earlier, comprising a laser, it is possible to associate with the beam emitted by said laser, a scanning system and a converging lens with a variable focal length and thus have the beam emitted by the laser converge towards the aforesaid convergence point which is associated with each point of the image conveyed by the scanning of said beam.

Advantageously, the aforesaid scanning system associated with a converging lens of variable focal length, may consist of two galvanometric scanning mirrors.

Figure 12:
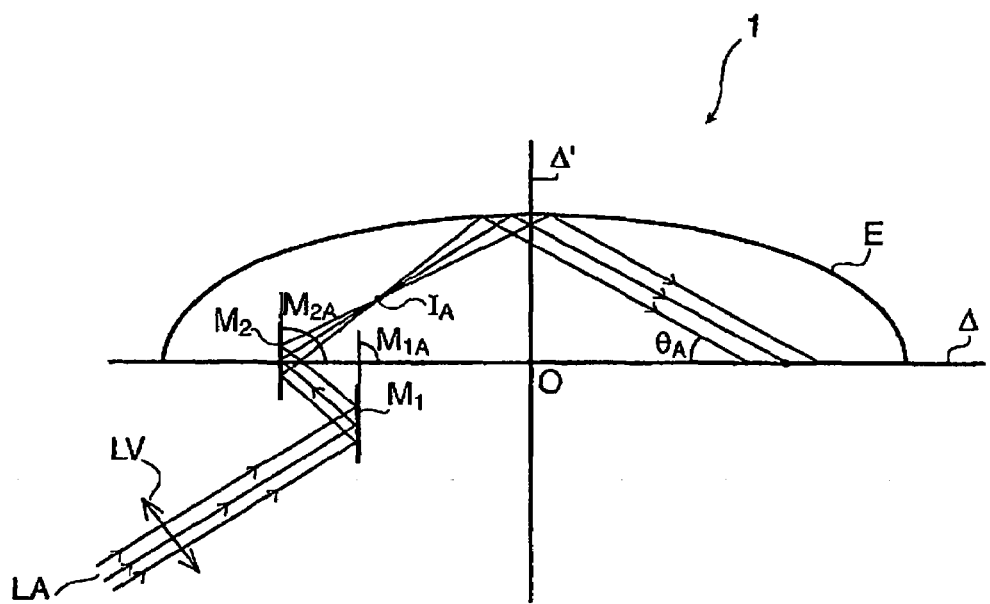
FIG. 12 is a schematic illustration of an embodiment concerning the first solution correcting optical aberrations notably those related to distortion, for a first point of the field.
Figure 13:
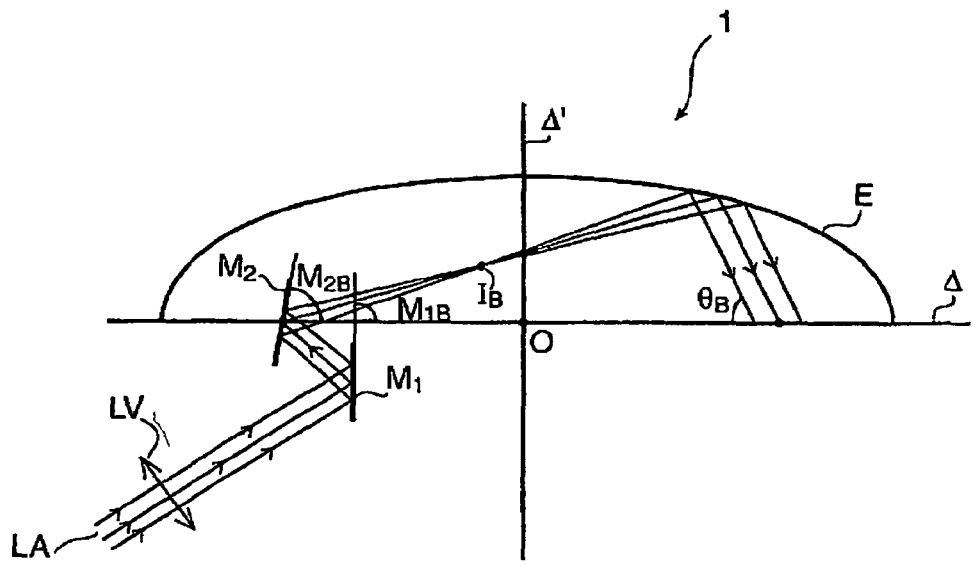
FIG. 13 is a schematic illustration of the embodiment concerning the first solution correcting optical aberrations notably those related to distortion, for a second point of the field.

In the example illustrated in FIGS. 12, 13, an embodiment is proposed concerning the first solution, as described earlier, correcting the optical distortion, for a first point of the field and a second point of the field, respectively.

As indicated in FIGS. 12, 13, the collimated laser source LA is followed by a lens with variable focal length LV and two galvanometric scanning mirrors $M_1$, $M_2$.

In the example illustrated in FIG. 12, for a point A of the field, said mirrors $M_1$, $M_2$, are angularly positioned according to the angles $M_{1A}$, $M_{2A}$, respectively, (defined anti-clockwise relatively to the major axis Δ); moreover, the focal length $F_A$ of the lens with variable focal length LV is such that the rays of the laser beam, after reflection on both mirrors $M_1$, $M_2$, focused in a point $I_A$, and then after reflection on the substantial elliptical diopter E, end up collimated close to the eye with an angle $\theta_A$ corresponding to the aforesaid point A in the field.

In the example illustrated in FIG. 13 for a point B from the field, said mirrors $M_1$, $M_2$, are angularly positioned according to the angles $M_1 B$ $M_2 B$ respectively, (defined anti-clockwise relatively to the major axis Δ); moreover, the focal length $F_B$ of the lens with variable focal length LV is such that the rays of the laser beam, after reflection on both mirrors $M_1$, $M_2$, focused in a point $I_B$, and then after reflection on the substantial elliptical diopter E, end up collimated close to the eye with an angle $\theta_B$ corresponding to the aforesaid point B in the field.

Thus, each point i of the image is described by a triplet of voltages $(V_{LVi}, V_{M1i}, V_{M2i})$ respectively, corresponding to the applied electrical voltages on the lens with variable focal length LV and on the galvanometric scanning mirrors $M_1$, $M_2$.

This solution, using a system with a variable focal length (from an existing lens of diameter 8 mm, for example) and two galvanometric scanning mirrors, is a first solution allowing suppression of the convergence of the rays passing through the pupil of the eye.

A second solution, allowing this distortion to be suppressed, consists of introducing into the path of the rays a second strictly inverted distortion by using a second substantially elliptical diopter identical with the first.

Figure 14:
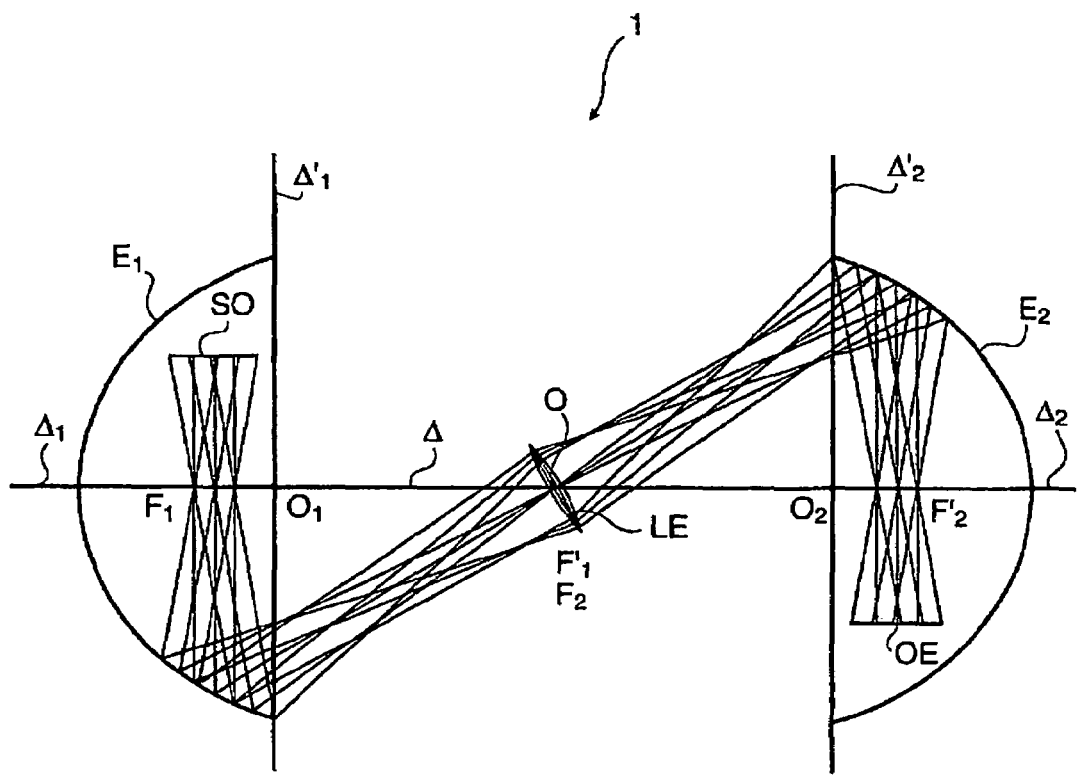
FIG. 14 is a schematic illustration of the second solution, with which optical aberrations notably those related to distortion, may be corrected, FIGS. 15, 16, schematically illustrate two other embodiments, with which parallel rays at the entrance of the eye and correction of optical aberrations may be obtained.

In the example illustrated in FIG. 14, the device according to the invention consists of:

two substantially elliptical diopters $E_1$, $E_2$, positioned as nested, the major axes $\Delta_1$, $\Delta_2$ of which are co-linear, two of their foci coincide with a same point O, the other two foci, $F_1$, $F_2'$, respectively, are equidistant on either side of said point O, a converging lens LE located in the vicinity of point O, a light source SO consisting of a laser associated with a scanning system, located in the first substantially elliptical diopter $E_1$, or of a collimated luminous display, the eye, located in the second substantially elliptical diopter $E_2$.

The rays emitted by the light source SO converge after reflection on the first substantially elliptical diopter $E_1$, and are then directed towards the lens LE. This lens LE provides a transverse magnification equal to −1 in the mentioned example and causes the beams after reflection to converge on the second substantially elliptical diopter $E_2$, to finally end up in the vicinity of the eye OE, as parallel rays associated with each image point, after reflection on the second substantially elliptical diopter $E_2$.

It should be noted that in the case when the second optical diopter is strictly identical with the first optical diopter, the lens LE should provide a transverse magnification equal to −1.

However, in order to reduce the bulkiness of the whole device according to the invention, a second optical diopter may be selected to be smaller than the first optical diopter, in this case, the transverse magnification of the lens LE will be adapted.

Other configurations may be contemplated in order to achieve focusing of different "object points" according to the specific curvature as described earlier, before actual reflection on the substantially elliptical diopter.

These configurations may consist of setting up:

an off-axis spherical mirror and a group of lenses, one or more groups of spherical or aspherical lenses, a prismatic body and a group of lenses,
a matrix of micro-lenses and a prismatic body,
an optical fiber and a group of lenses,
optical elements comprising diffraction gratings (blazed grating) or holographic gratings ("HOE: Holographic Optical Elements").

Figure 15:
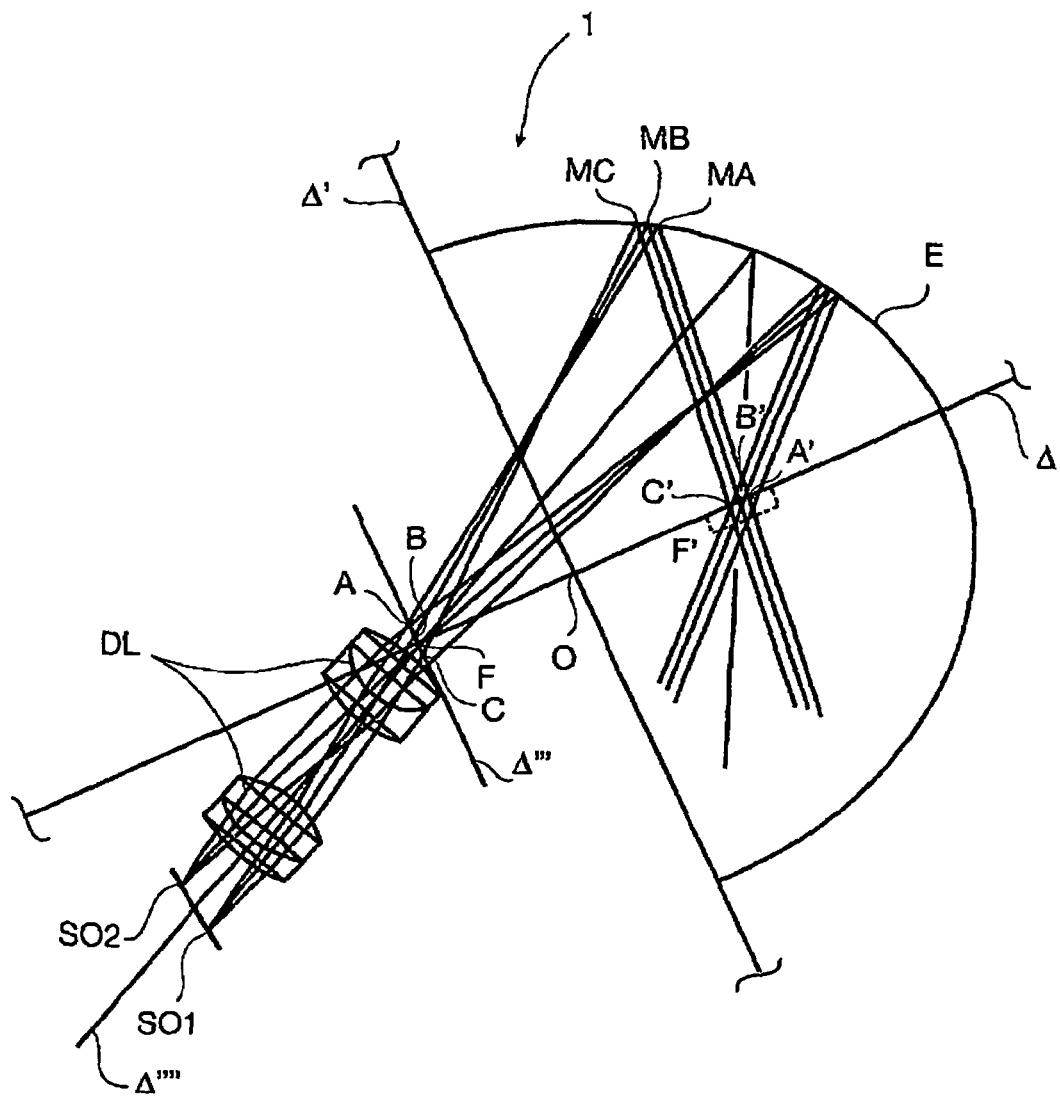
Figure 16:
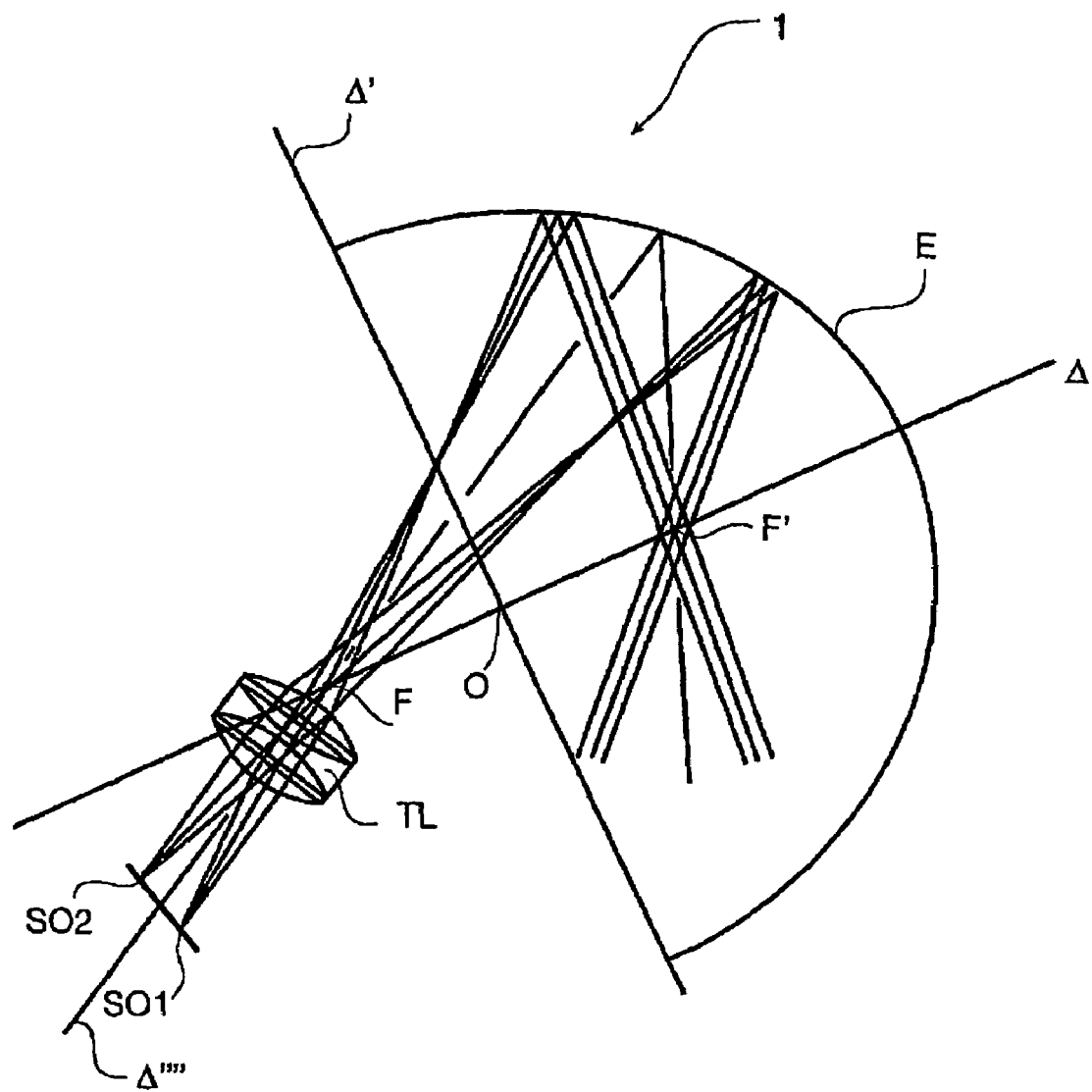

In the examples illustrated in FIGS. 15, 16, with the device 1 according to the invention, parallel rays may be obtained, which enter the pupil of the eye for each of the source points as indicated in FIGS. 10, 11.

The device consists of:
a substantially elliptical diopter illustrated by the half ellipse E defined by its major axis Δ, its minor axis Δ', its centre O, and its two foci F, F' located on the major axis Δ, on either side of the centre O.
the so-called "source" focus, here consisting of a luminous display and of one or more groups of lenses aligned along the Δ'" axis, is positioned in the vicinity of the first focus F of said substantially elliptical diopter E so that the rays arrive parallel in the vicinity of the second focus F' of said substantially elliptical diopter E where is positioned the centre of the eye OE of the observer.

This embodiment, using one or more groups of lenses, has the advantage of an optical configuration much easier to achieve technically while allowing parallel beams to be obtained, entering the pupil of the eye for each of the source points with correction of the optical aberrations.

In the example illustrated in FIG. 15, where two groups of lenses DL are used, the trajectory of each of the two beams is symbolized by three rays, and each of the beams being associated with a source point $SO_1$, $SO_2$.

In the case of a single beam, its three rays are from three points A, B, C, located on an axis Δ''', perpendicular to the Δ axis and pass through the first focus F:
ray $AM_A A'$ from point A, is reflected in the vicinity of point $M_A$ on the ellipse and then ends up at point A' located on the A axis, close to the second focus F',
ray $BM_B B'$ from point B, is reflected in the vicinity of point $M_B$ on the ellipse and then ends up at point B' located on the Δ axis, close to the second focus F',
ray $CM_C C'$ from point C, is reflected in the vicinity of point $M_C$ on the ellipse and then ends up at point C' located on the Δaxis, close to the second focus F'.

The three reflected rays $M_A A'$, $M_B B'$, $M_C C'$ are parallel.
Here, it will be noted that:
points A, B, C are from a same source point $SO_1$, of the luminous display,
said luminous display being positioned on the optical axis may be tilted by an angle of α,
each source point $SO_1$, $SO_2$, emits a light beam,
all the main or central rays cross in the vicinity of the focus F and in the vicinity of the focus F'.

In the example illustrated in FIG. 16, the device 1, according to the invention, is formed in an identical way with that illustrated in FIG. 15, except for the presence of a single group of lenses TL instead and in the place of both groups of lenses DL.

Figure 17:
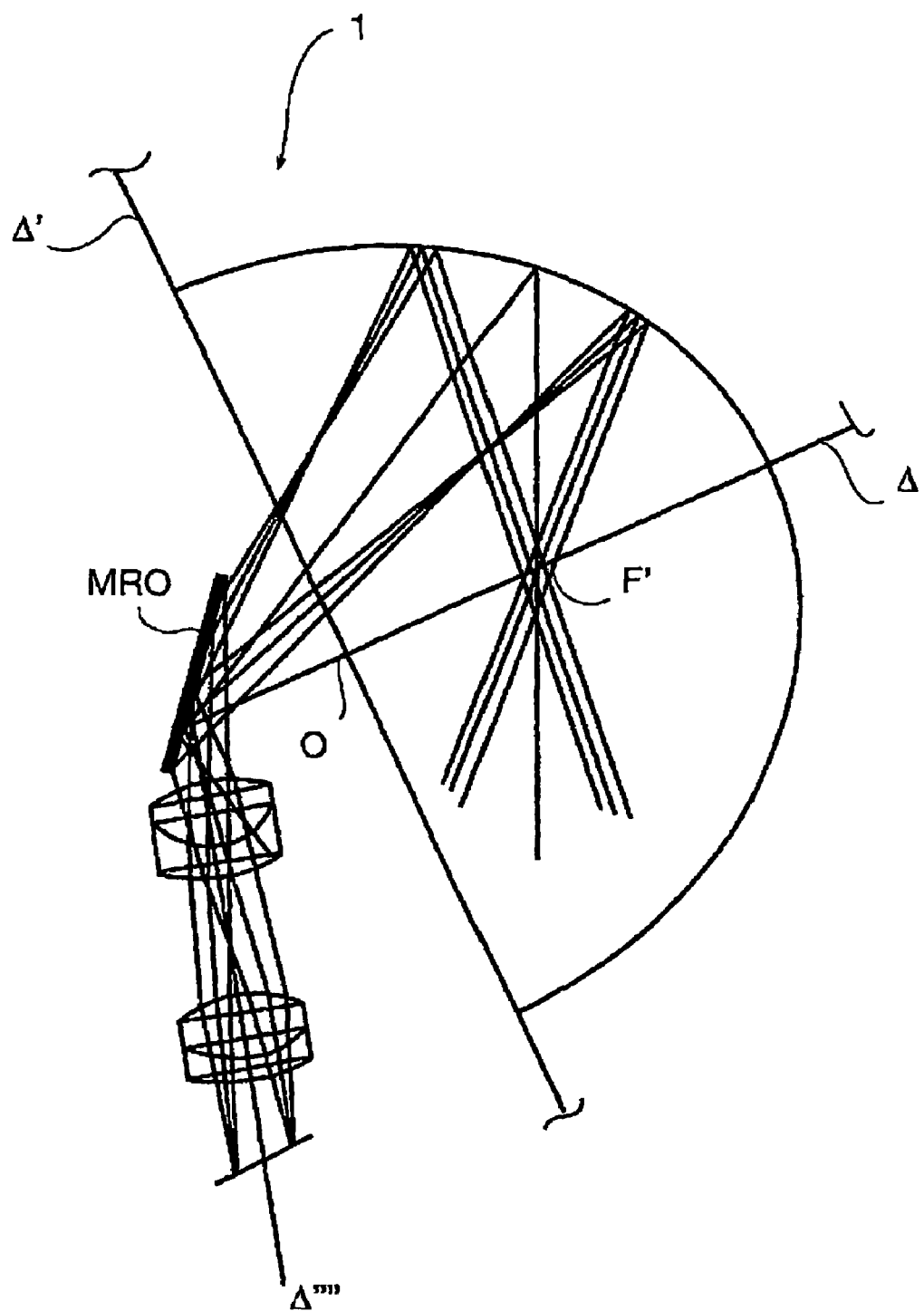
FIG. 17 is an arrangement of the device according to the invention, according to the embodiments illustrated in FIGS. 15, 16, and FIGS. 18, 19, schematically illustrate a possible development of the embodiments mentioned earlier, with which a more complete viewing system may be achieved.

In the example illustrated in FIG. 17, in order to make the device 1 according to the invention less bulky in space, an optical reflecting mirror MRO is inserted on the optical path in the vicinity of the focus (F), so as to be able to shift the axis Δ'''', the alignment of the group(s) of lenses and the display according to a selected angle.

In the present case, this is an embodiment derived from the device 1 according to the invention illustrated in FIG. 15 and described earlier.

Thus, by utilizing the stigmatism specific to the two foci of an ellipse, a monocular or stereoscopic optical system may be achieved which allows the generating of retinal images; said proposed optical system allows the viewing by the retina of the eye of virtual realities such as images from a luminous matrix display or conveyed by a scanning laser system; moreover, the optical system allows the viewing, by the retina of the eye, of augmented realities, taking into account the transparence and semi-reflection features of the optical diopter.

Of course, the sections of the optical diopters, as described earlier, may be of a circular or substantially circular shape, said sections being defined according to better viewing comfort of the aforesaid augmented or virtual realities.

Figure 18:
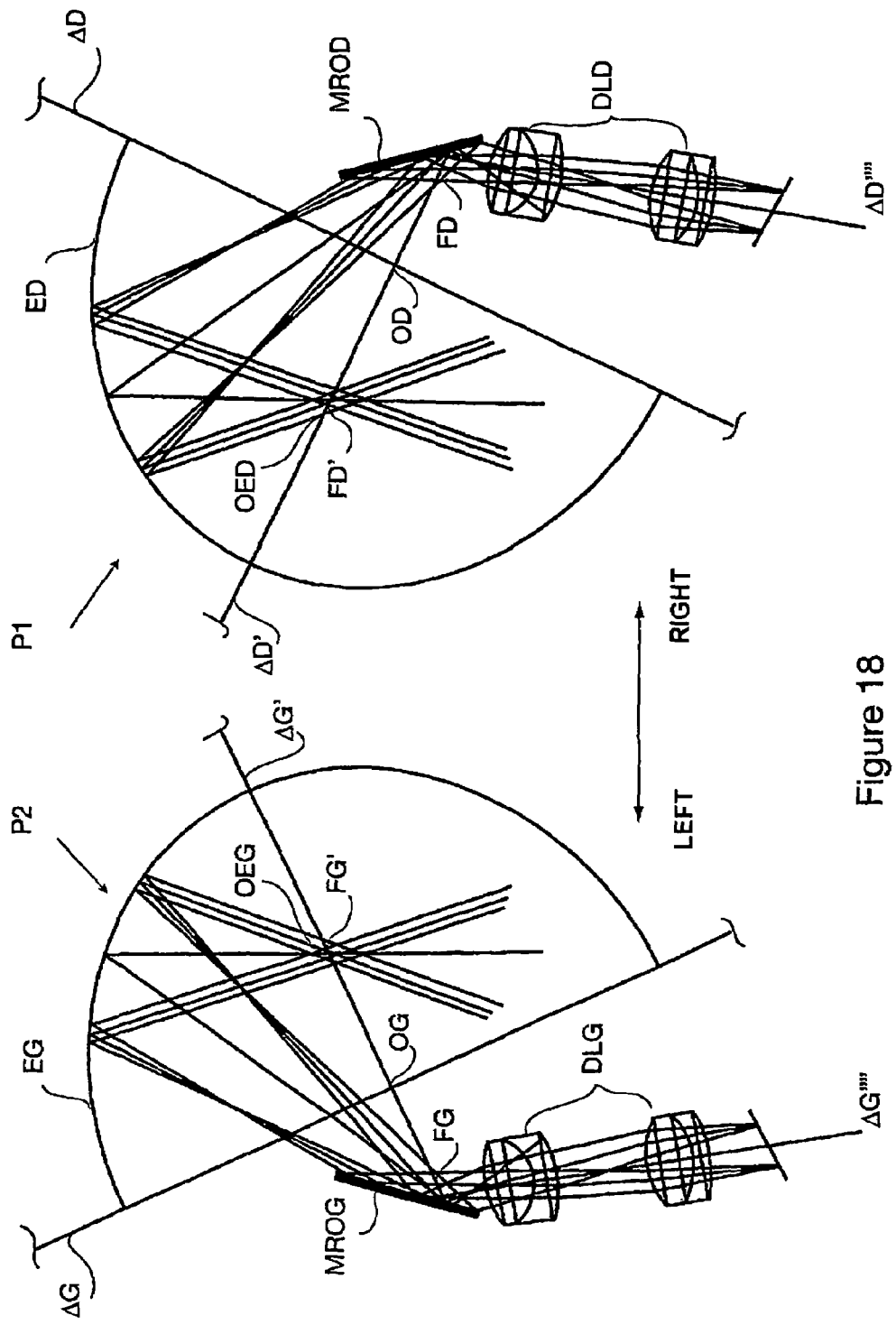
Figure 19:
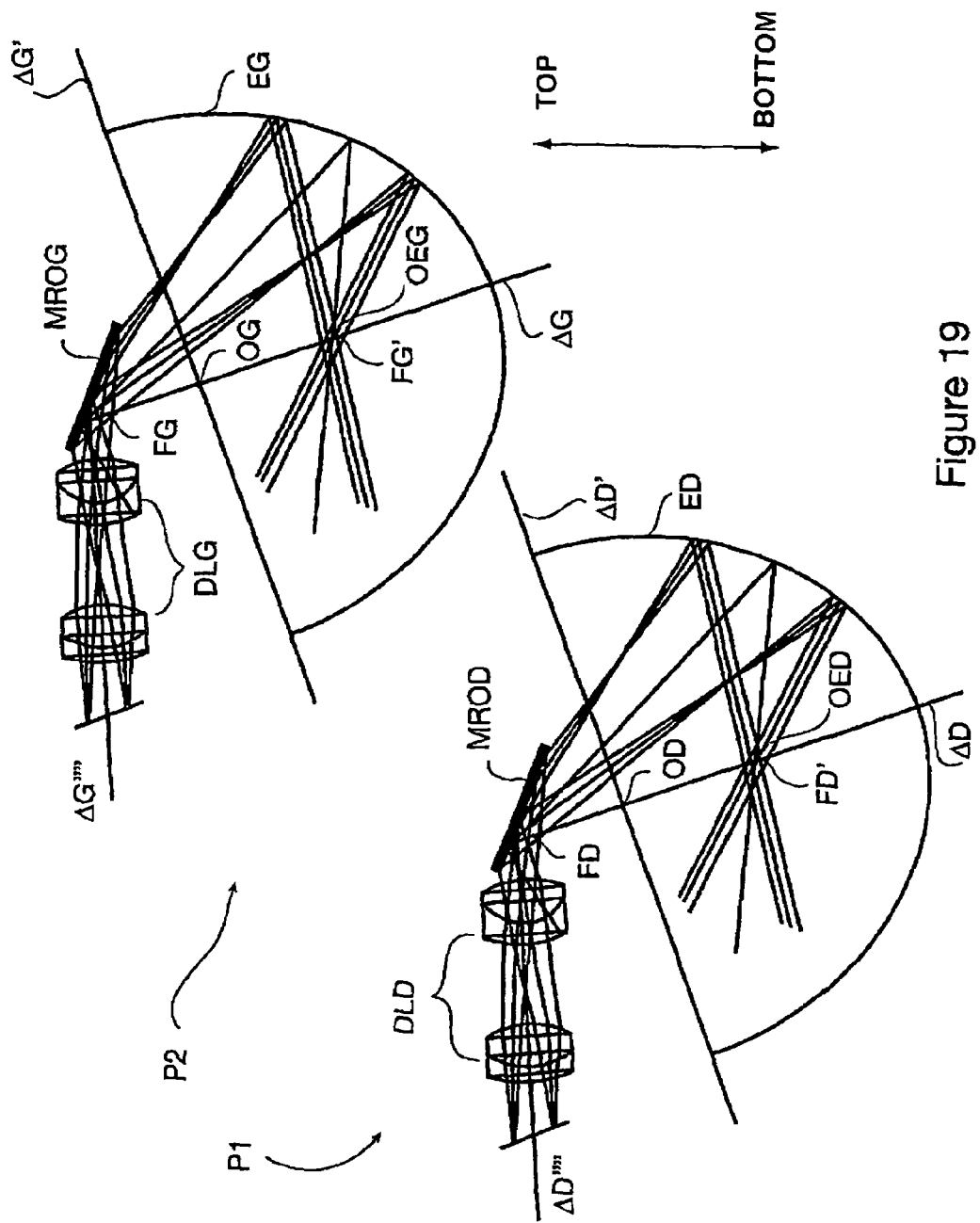

In the examples illustrated in FIGS. 18, 19, a possible development of a few embodiments according to the invention is illustrated, with which a more complete viewing system may be achieved.

This development is based on the utilization of optical reflecting mirrors MRO, as described earlier.

The device consists of:
two substantially elliptical diopters positioned beside each other, illustrated by their respective half-ellipse, ED or EG, each defined by their respective major axis ΔD or ΔG, their respective minor axis ΔD' or ΔG', and their two respective foci FD, FD', or FG, FG' located on their respective major axis ΔD or ΔG, on either side of their respective centre OD, or OG,
a so-called "source" focus, of diopter ED or EG, respectively, formed in this case, by a luminous display, a respective mirror, MROD or MROG, a group of lenses DLD or DLG aligned along the respective axis ΔD'''' or ΔG'''', is respectively positioned in the vicinity of the first focus FD or FG of said substantially elliptical diopter ED or EG, so that the rays arrive parallel in the vicinity of the second focus FD' or FG' of said respective substantially elliptical diopter ED or EG where the centre of the right eye OED or the centre of left eye OEG of the observer is positioned.

This development provides the possibility of extending the field of the capacities of the method according to the invention, within the scope of binocular or stereoscopic viewing.

Advantageously, it is seen that:
in the example illustrated in FIG. 18, the devices P1, P2 are both positioned:
foci FD, FD', FG, FG' are located in the same geometrical plane, foci FD, FG are located outside and foci FD', FG' are located inside, in other words the devices P1, P2 are positioned symmetrically,
in the example illustrated in FIG. 19, the devices P1, P2 are both positioned:
the alignment of foci FD, FG is located parallel to the alignment of foci FD', FG', in other words, the axis ΔD is parallel to the axis ΔG, said alignments of foci FD, FG, and of foci FD', FG', are positioned "up; down", in other words, foci FD, FG are positioned upwards and foci FD', FG' are positioned downwards,
such that the eyepieces OED, OEG are positioned in the vicinity of their respective focus FD' or FG'.

Within the scope of normal use of devices, such as described earlier, it is desirable to take into account the whole range of possible users.

Being aware that a certain number of potential users wear optical correction glasses due to a natural deficiency of their own ocular system, it is possible to integrate into the devices as described earlier, customizable optical correction means depending on each user.

Advantageously, for better reduction of the bulkiness, said optical correction means may be placed as close as possible to the eyepieces OED, OEG, by associating with each mount of the devices P1, P2, a rigid branch, said rigid branch being associated with the mount bearing the optical correction means.

Taking into account that the potential users have differences of an optical nature in their own ocular system as well as morphological differences, such as the interpupillary distance or the cephalic form for example, it is preferable to be able to integrate customizable optical adjustment means into the devices as described earlier.

The invention claimed is:

1. A method for generating retinal images using the stigmatism of two foci of a substantially elliptical diopter comprising a semi-reflecting surface, said method comprising:
    positioning in the vicinity of the first focus of said elliptical substantially diopter:
        a so-called "source" focus formed by the diaphragm of a pin diaphragm forming a convergence point of an image generated by a luminous display or a light source,
    positioning in the vicinity of the second focus of said substantially elliptical diopter, a so-called "image" focus formed by the pupil or the centre of the eye of the observer, and
    projecting in the vicinity of the retina of the eye of the observer, the image generated by said luminous display or by said light source and reflected by the semi-reflecting surface of said substantially elliptical diopter.

2. The method according to claim 1, wherein the said image generated by the luminous display is compressed according to a reciprocal mathematical function relatively to the distortion caused by the aforesaid substantially elliptical diopter.

3. The method according to claim 1, wherein the said image generated by the luminous display is slightly tilted in order to reduce the distortion caused by the aforesaid substantially elliptical diopter.

4. The method according to claim 1, wherein said method is carried out with an optical system generating an inverted distortion so as to compensate the distortion caused by the aforesaid substantially elliptical diopter.

5. The method according to claim 1, wherein said method is carried out with a scanning system and a converging lens with a variable focal lens associated with the light source.

6. The method according to claim 1, wherein said method is carried out with two identical substantially elliptical diopters separated by a converging lens with a transverse magnification equal to −1.

7. The method according to claim 1, wherein said method is carried out with two different substantially elliptical diopters separated by a converging lens with a transverse magnification different from −1.

8. A method for generating retinal images using the stigmatism of two foci of a substantially elliptical diopter comprising a semi-reflecting surface, said method comprising:
    positioning in the vicinity of the first focus of said substantially elliptical diopter:
        a luminous display, each object point of which generates a beam first of all convergent before reflection on the semi-reflecting surface of said substantially elliptical diopter, and then parallel in the vicinity of the pupil of the eye,
    positioning in the vicinity of the second focus of said substantially elliptical diopter, a so-called "image" focus formed by the pupil or the centre of the eye of the observer, and
    projecting in the vicinity of the retina of the eye of the observer, the image generated by said luminous display and reflected by the semi-reflecting surface of said substantially elliptical diopter.

9. The method according to claim 8, wherein said method is carried out with an optical system generating an inverted distortion so as to compensate the distortion caused by the aforesaid substantially elliptical diopter.

10. The method according to claim 8, wherein said method is carried out with two identical substantial elliptical diopters separated by a converging lens with a transverse magnification equal to −1.

11. The method according to claim 8, wherein said method is carried out with two different substantially elliptical diopters separated by a converging lens with a transverse magnification different from −1.

12. A device for generating retinal images, using the stigmatism of two foci of a substantially elliptical diopter comprising a semi-reflecting surface, comprising:
    a so-called "source" focus formed by:
        the diaphragm of a pin diaphragm forming a convergence point of an image generated by a luminous display, or a light source,
    a so-called "image" focus formed by the pupil or the centre of the eye of the observer, positioned in the vicinity of the second focus of said substantially elliptical diopter,
    a projection in the vicinity of the retina of the eye of the observer, of the image generated by said luminous display of by said light source, and reflected by the semi-reflecting surface of said substantially elliptical diopter.

13. The device according to claim 12, comprising optical correction means adapted to the ocular system of the user.

14. The device according to claim 13, wherein the said optical correction means adapted to the ocular system of the user are adjustable.

15. A device for generating retinal images, using the stigmatism of two foci of a substantially elliptical diopter comprising a semi-reflecting surface, comprising:
    a so-called "source" focus formed by:
        a luminous display, each object point of which generates a beam first of all convergent before reflection on the semi-reflecting surface of said substantially elliptical diopter, and then parallel in the vicinity of the pupil of the eye,
    positioned in the vicinity of the first focus of said substantially elliptical diopter,
    a so-called "image" focus formed by the pupil or the centre of the eye of the observer, positioned in the vicinity of the second focus of said substantially elliptical diopter,
    a projection in the vicinity of the retina of the eye of the observer, of the image generated by said luminous display, and reflected by the semi-reflecting surface of said substantially elliptical diopter.

16. The device according to claim 15, comprising optical correction means adapted to the ocular system of the user.

17. The device according to claim 16, wherein the said optical correction means adapted to the ocular system of the user are adjustable.

* * * * *